A. S. DENNIS.
COMPUTING MACHINE.
APPLICATION FILED FEB. 18, 1913.
1,248,281.
Patented Nov. 27, 1917.
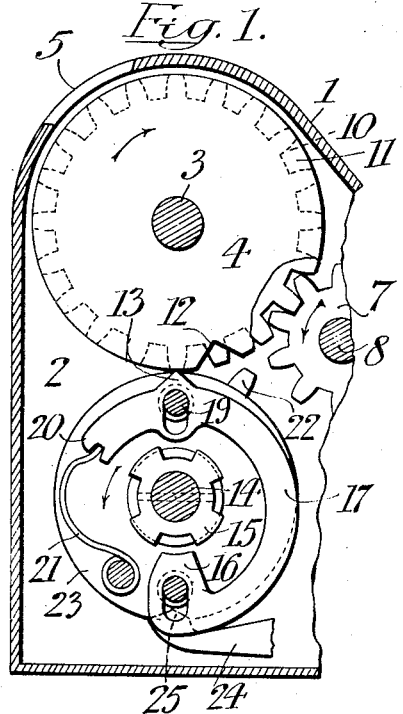
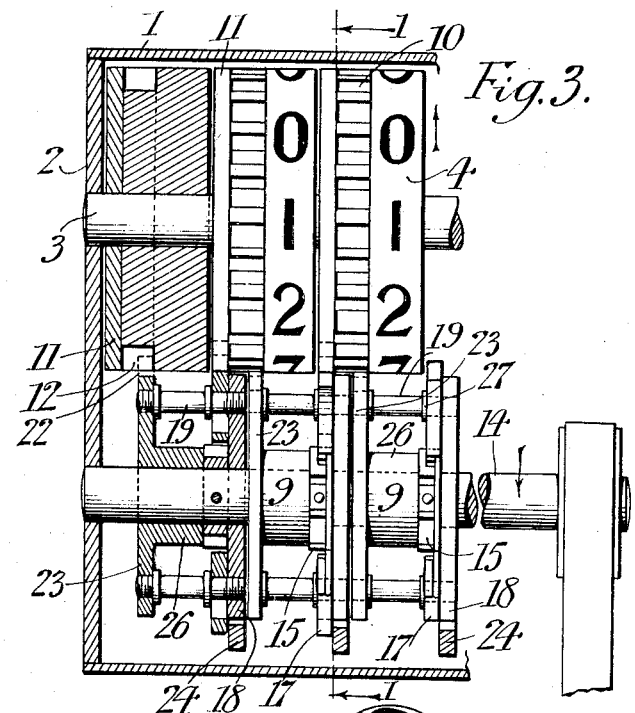
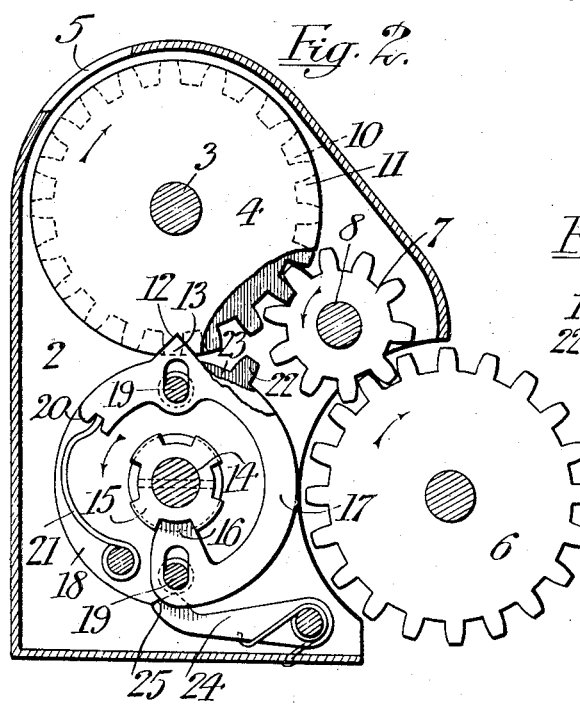
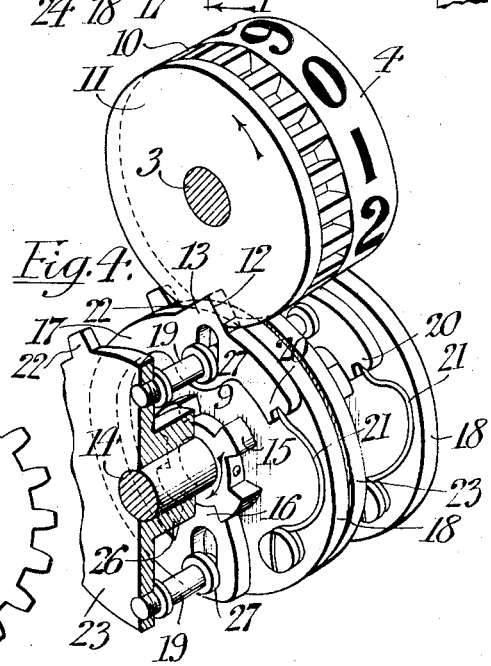
Witnesses:
Titus H. Irons
F. E. Alexander
Inventor
Adolphus S. Dennis
by B. C. Stickney
his Attorney

UNITED STATES PATENT OFFICE.

ADOLPHUS S. DENNIS, OF LAKEWOOD, OHIO, ASSIGNOR, BY MESNE ASSIGNMENTS, TO UNDERWOOD COMPUTING MACHINE COMPANY, OF NEW YORK, N. Y., A CORPORATION OF NEW YORK.

COMPUTING-MACHINE.

1,248,281. Specification of Letters Patent. Patented Nov. 27, 1917.

Application filed February 18, 1913. Serial No. 749,074.

*To all whom it may concern:*

Be it known that I, ADOLPHUS S. DENNIS, a citizen of the United States, residing in Lakewood, in the county of Cuyahoga and State of Ohio, have invented certain new and useful Improvements in Computing-Machines, of which the following is a specification.

My invention relates to carry-over devices for computing machines.

As is usual in computing machines, computing wheels are mounted in a gang and said wheels are arranged to be engaged and turned in any suitable manner to register the desired numbers; whenever an numeral wheel completes a revolution, the adjacent computing wheel higher in denomination is turned one point by means of a suitable carry-over device. Such a machine is illustrated in the British patent to Wright, No. 8740/1909.

The present invention is especially directed toward making the carry-over mechanism in computing machines simpler and more efficient, and toward relieving the computing wheel from the load of operating said carry-over device, and is an improvement on said British patent. According to the present invention, the carry-over wheels are individually driven by a shaft, and said shaft preferably is continuously power-driven.

According to the preferred form of the present invention, the carry-over wheels are journaled on a shaft, and said shaft carries a clutch for each carry-over wheel, said clutches being so arranged that whenever a computing-wheel brings its zero to the sight opening, said computing wheel makes effective the clutch belonging to its carry-over wheel thereby turning said carry-over wheel through a definite amount.

In the form herein disclosed the amount each carry-over wheel is turned is a full revolution, and its clutch is automatically disconnected at the end of the revolution of the carry-over wheel. In order to prevent the carry-over wheels from being overthrown, they may be arrested by spring pressed detents, which detents tend to bring the carry-over wheels to rest at the end of each revolution. Each carry-over wheel may have its clutch controlled by a finger, which finger is operated by the computing wheel, and said finger preferably forms a directly acting member of said clutch so as to make the action extremely rapid. The computing wheels thus may take no part in the actual turning of the carry-over wheels, but merely operate said fingers. This entirely takes the load of turning a long string of carry-over wheels off the computing wheels.

Other features and advantages will hereinafter appear.

In the accompanying drawings,

Figure 1 is a right hand sectional view of a totalizer embodying the present invention, on the line 1—1, Fig. 3, showing the carry-over as passive.

Fig. 2 is a similar view showing the parts in the position they would occupy in going from "9" to "0," the carry-over clutch having seized to start a rotation of the disk carrying the boosting or carry-over tooth.

Fig. 3 is a front view partly in section with the casing removed.

Fig. 4 is a perspective front view showing the relation of a computing wheel to the carry-over devices in passing between 9 and 10.

The computing machine includes a casing 1 in which is supported by the ends 2 a transverse shaft 3 on which shaft are journaled a plurality of dial or computing wheels 4 bearing numerals on their periphery, so that said numerals are successively presented behind a sight opening 5 in said casing. Said computing wheels are arranged to be successively turned by a master wheel 6 which has a step-by-step movement with reference to said casing. Said movement may be brought about in any usual manner, and the means for accomplishing said movement forms no part of the present invention.

Said master wheel 6 does not engage the computing wheels 4 directly, but engages *seriatim* with idle wheels 7, which are journaled on a shaft 8; there being one of said idle wheels 7 for each computing wheel, and each of said wheels being constantly in mesh with its computing wheel. In using the machine for addition, whenever any computing wheel is turned so as to present its zero to the sight opening 5, it turns the adjacent computing wheel of next higher denomination through one unit space, so that said adjacent wheel will read one numeral higher than it did before. This is accomplished through carry-over wheels 9.

For effecting this through the carry-over wheel, which is to operate the computing wheel higher in denominaion, each computing wheel comprises a gear 10 fast thereon; and at the edge of said computing wheel, outside of said gear, is fast a disk 11 forming an integral part of said computing wheel. Said disk 11 has a smooth periphery except at one point at which there is a depression 12 which coöperates with a finger 13 on said carry-over wheel 9. Said depression is so located with reference to the numeral zero on its computing wheel that, as said computing wheel turns from nine to zero, it turns said depression 12 completely past said finger 13, thus allowing said finger 13 to sink into the depression, but immediately thereafter presents to said finger the smooth periphery of the disk 11.

The carry-over wheels 9 are loosely journaled on a shaft 14 which may be power-driven as diagrammatically shown in Fig. 3. Each finger 13 controls a clutch which is adapted to connect its carry-over wheel with said power-driven shaft 14, so as to cause said carry-over wheel to be turned by the shaft 14, and in so turning said carry-over wheel turns the adjacent computing wheel higher in denomination through one unit of its revolution. Each of these clutches comprises a series of teeth 15 fast on the shaft 14, and also comprises a tooth 16 which is carried by the carry-over wheel 9 in such a way that it is moved by the finger 13 into and out of engagement with the teeth 15. When he teeth 15 are in engagement with the tooth 16, the carry-over wheel will be carried around by its shaft, but the clutch is so controlled by the computing wheel that said clutch will hold the carry-over wheel to the shaft 14 during one revolution only.

To bring this about, the tooth 16 is formed as an extension of the finger 13. Said tooth and finger are formed at the ends of the curved bar 17 which lies against the face of the plate 18 forming part of the carry-over wheel, said bar being guided by pillars 19 fast on said plate. Said bar 17 comprises an extension 20 which forms an abutment for a spring 21 anchored on the plate 18, so that said spring presses the finger 13 constantly against the disk 11 of the computing wheel controlling it. Thus the spring will press the finger 13 into the depression 12, whenever said depression comes adjacent the carry-over wheel, and thereby move the bar 17 so that the tooth 16 engages with the teeth 15, thereby clutching the carry-over wheel to the shaft 14. When so clutched, the shaft will carry said carry-over wheel around, so that a tooth 22, forming part of a plate 23 carried by the pillars 19, will strike the gear 10 of the computing wheel next higher in denomination and turn said computing wheel sufficiently to bring the next higher numeral on said wheel before the sight opening 5. The carry-over wheel then turns idly during the remainder of its revolution. Said carry-over wheel at the end of its revolution has its clutch automatically disconnected, because the finger 13 will strike the unbroken smooth periphery of the disk 11 on the computing wheel controlling it. Said carry-over wheel will be prevented from being carried too far around by its momentum by means of a spring-pressed detent 24 which enters an opening 25 in the plate 18 of the carry-over wheel. Said detent 24 also prevents the finger 13 from being carried around by the friction of the computing wheel, and thus prevents accidental seizing of the clutch.

The plate 23, which forms part of the carry-over wheel, has a hub 26 formed on it so as to give said carry-over wheel a long bearing on the shaft 14, and the teeth 15, which are fast on the shaft 14, preferably lie between said hub 26 and the plate 18.

The pillars 19 screw into the plates 23 and 18 and include collars 27 which hold the bar 17 in place against the face of the plate 18 as it slides thereon.

The tooth 22 on each carry-over wheel which turns the adjacent computing wheel, preferably stands at such a point that it turns said adjacent computing wheel soon after the carry-over wheel begins to turn. This insures rapid action of the carry-over mechanism, and where carrying-over is done on a long string of nines, the carry-over on the last nine will not be delayed as it would be were the teeth 22 arranged to turn their computing wheels late in a revolution. For the same purpose it is preferable to have a number of teeth 15 fast on the shaft 14 with which the clutch tooth 16 may engage, so that said shaft will only turn a small portion of a revolution before the clutch seizes.

It should be noted that while the carry-over devices have been described as carry-over wheels, they are in effect levers which may be clutched to a power driven shaft. It should also be noted that the depression 12 on the computing wheel is so arranged that such depression never stands at rest opposite the finger 13, but the computing wheel in turning from nine to zero causes said depression to pass said finger 13, thereby making the clutch momentarily operative, but by the time the finger 13 has been brought around by the revolution of the carry-over wheel, so that it is again adjacent the computing wheel 4, the smooth periphery of said computing wheel is opposite said finger 13 and said finger is depressed so as to release said clutch.

Variations may be resorted to within the scope of the invention, and portions of the improvements may be used without others.

Having thus described my invention, I claim:

1. In a computing machine, the combination with a computing wheel, of a power driven shaft, a carry-over wheel loose on said shaft, and means operable by said computing wheel for clutching said carry-over wheel to said shaft.

2. In a computing machine, the combination with a computing wheel, of a carry-over wheel, a power driven shaft on which said carry-over wheel is journaled, a clutch comprising a member fast to said shaft and a member fast to said carry-over wheel, and means controlled by said computing wheel for causing said clutch to seize.

3. In a computing machine, the combination with a computing wheel and a shaft adapted to be driven by power, of a carry-over wheel journaled on said shaft, a clutch between said shaft and said carry-over wheel normally ineffective, and a bar controlling said clutch normally riding on the smooth periphery of said omputing wheel, said computing wheel having an opening in said periphery adapted to cause said clutch to seize.

4. In a computing machine, the combination with a computing wheel having a break on its surface and a carry-over wheel, of a shaft adapted to be driven by power on which said carry-over wheel is journaled, teeth on said shaft, a member shiftable on said carry-over wheel to engage said teeth, a spring urging said member to engage said teeth and a finger riding on the surface of the computing wheel restraining said spring and arranged when entering said break to permit said member to engage said teeth.

5. In a computing machine, the combination with a computing wheel and a carry-over wheel, of a shaft arranged to be driven, on which shaft said carry-over wheel is journaled, a clutch between said carry-over wheel and its shaft, a finger normally holding said clutch released by contact with said computing wheel, a tooth on said carry-over wheel for turning the adjacent computing wheel, and a spring holding said clutch in its seized position.

6. In a computing machine, the combination with a computing wheel and a carry-over wheel, of a shaft arranged to be power driven, and means for causing a computing wheel when a carry-over is to be made to cause said carry-over wheel to be driven a single complete revolution by said power-driven shaft.

7. In a computing machine, the combination with a computing wheel comprising a smooth periphery and a depression therein, of a carry-over wheel having a finger adapted to ride on said periphery and enter said depression, a clutch controlled by said finger, means for causing said computing wheel to bring said depression in front of said finger momentarily when it is desired to make a carry-over, and a power driven shaft to which said carry-over wheel is clutched whenever said finger enters said depression.

8. In a computing machine, the combination with a computing wheel and a carry-over wheel, of pillars on said carry-over wheel, an extension carried by said pillars, a tooth fast on said extension, a clutch member slidably guided by two of said pillars, a finger forming an extension of said clutch member bearing against the periphery of the computing wheel, a shaft arranged to be power driven on which said carry-over wheel is journaled, a clutch member fast on said shaft, and a spring arranged to cause said clutch members to seize whenever said finger is no longer restrained by the computing wheel.

9. In a computing machine, the combination with a computing wheel, of a carry-over wheel, a shaft arranged to be power-driven on which shaft said carry-over wheel is journaled, means for causing said carry-over wheel to be clutched to said shaft when it is desired to make a carry-over, and a tooth on said carry-over wheel arranged to turn the adjacent computing wheel just after said carry-over wheel is clutched to said shaft.

10. In a computing machine, the combination with a computing wheel and a shaft arranged to be power driven, of a carry-over wheel comprising a hub journaled on said shaft, pillars extending from said wheel, a plate carried by said pillars, teeth on said shaft adjacent said plate, a toothed member slidable on two of said pillars, a spring urging said tooth to engage with the shaft teeth, and a finger forming an extension of said toothed member bearing against the computing wheel to hold the tooth on said member free of said shaft teeth.

11. In a computing machine, the combination with computing wheels, of carry-over wheels, a tooth on each carry-over wheel for turning a computing wheel, a tooth on each carry-over wheel for determining by a computing wheel whether its other tooth shall be effective, and a power driven shaft for making said carry-over wheel effective.

12. In a computing machine, the combination with a dial wheel, of a carry-over wheel, a power shaft for driving said carry-over wheel, and a one revolution clutch for each carry-over wheel adapted to drive it from said power shaft.

13. In a computing machine, the combination with dial wheels and carry-over wheels, of a power shaft for driving said carry-over wheels and on which they are carried, and a one revolution clutch for each carry-over wheel under the control of its computing wheel for driving the carry-over wheel.

14. In a computing machine, the combination with dial wheels and carry-over wheels, of a power shaft for driving said carry-over wheels, and a clutch under the control of each computing wheel for operatively connecting each carry-over wheel to the power shaft to be driven thereby to a predetermined extent.

15. In a computing machine, the combination with a dial wheel, of a carry-over wheel, a power shaft for driving said carry-over wheel, a detent normally holding said carry-over wheel, and a clutch for each carry-over wheel adapted to drive it from said power shaft to a predetermined extent, said clutch being under the control of the computing wheel.

16. The combination, with a master wheel, and a set of computing wheels having a relative step-by-step movement therebetween; of a one-revolution device individual to each computing wheel to turn it in a carry-over operation, said carry-over devices operating independently of one another.

17. In a computing machine, the combination with a computing wheel and a carry-over wheel, of a power shaft, means normally holding said carry-over wheel disconnected from said power shaft, and means under the control of the computing wheel for automatically connecting the carry-over wheel to the power shaft to be driven thereby.

18. In a computing machine, the combination with a computing wheel and a carry-over wheel, of a power shaft, a device normally tending to connect said carry-over wheel to the power shaft, and means under the control of the computing wheel for holding it disconnected.

19. In a computing machine, the combination with a computing wheel, a carry-over wheel and a power shaft for the carry-over wheel, of means for connecting said carry-over wheel to be driven by the power shaft for accomplishing a carry-over on the computing wheel, and means for automatically disconnecting it before a second carry-over can take place.

20. In a computing machine, the combination with a computing wheel, a carry-over wheel and a power shaft on which the carry-over wheel is carried, of means connecting said carry-over wheel to the power shaft for accomplishing a carry-over on the computing wheel, and means for automatically disconnecting it before a second carry-over can take place.

21. In a computing machine, the combination with a dial wheel having sunken teeth, of a master wheel having spur teeth, an intermediate wheel having spur teeth, and a carry-over wheel having a spur tooth coöperating with the sunken teeth of the dial wheel.

22. In a computing machine, the combination with a series of dial wheels, of a series of carry-over wheels each having a single complete revolution when effective, a power shaft for driving them to the extent of one revolution, and connections such that the carry-over will be completed on a long series of said computing and carry-over wheels in an inappreciable length of time.

23. The combination with a plurality of computing wheels, of carry-over units for said computing wheels, and a source of power, each of said computing wheels clutching and unclutching its associated carry-over unit to said source of power.

24. The combination with a plurality of computing wheels, of carry-over units brought into play by said computing wheels, and a power drive for relieving said computing wheels of the burden of rotating each other in a carry-over operation by assuming the total rotary movement of said carry-over units.

25. The combination, with a carry-over wheel normally restrained from rotation, and a power shaft whereon it is loosely mounted, said shaft rotating relatively to said wheel at times; of carry-over devices including means for connecting said wheel to said shaft to be rotated thereby.

26. The combination, with a carry-over wheel normally restrained from rotation, and a power shaft whereon it is loosely mounted, said shaft rotating relatively to said wheel at times; of carry-over devices including an automatic clutch for connecting said wheel to said shaft to be rotated thereby.

ADOLPHUS S. DENNIS.

Witnesses:
Titus H. Irons,
Julius Duckstine.